United States Patent
Shmidt et al.

(10) Patent No.: US 10,005,680 B2
(45) Date of Patent: Jun. 26, 2018

(54) DEVICE FOR PURIFYING A LIQUID

(71) Applicant: AQUAPHOR PRODUCTION CORPORATION, St. Petersburg (RU)

(72) Inventors: Jozeph Lvovich Shmidt, Woodmere, NY (US); Vladimir Sergeevich Urozhaev, St. Petersburg (RU); Uriy Vladimirovich Tatuev, St. Petersburg (RU)

(73) Assignee: ELECTROPHOR INC., Dobbs Ferry, NY (US)

( * ) Notice: Subject to any disclaimer, the term of this patent is extended or adjusted under 35 U.S.C. 154(b) by 162 days.

(21) Appl. No.: 15/022,232

(22) PCT Filed: Oct. 27, 2014

(86) PCT No.: PCT/RU2014/000812
§ 371 (c)(1),
(2) Date: Mar. 16, 2016

(87) PCT Pub. No.: WO2015/076701
PCT Pub. Date: May 28, 2015

(65) Prior Publication Data
US 2016/0229712 A1    Aug. 11, 2016

(30) Foreign Application Priority Data
Nov. 22, 2013  (RU) ................. 2013152133

(51) Int. Cl.
*B01D 63/00* (2006.01)
*B01D 35/14* (2006.01)
(Continued)

(52) U.S. Cl.
CPC ................. *C02F 1/42* (2013.01); *B01J 39/18* (2013.01); *B01J 49/75* (2017.01); *B01J 49/85* (2017.01);
(Continued)

(58) Field of Classification Search
CPC .... C02F 2209/005; C02F 1/42; C02F 1/4602; C02F 2303/14; B01D 15/00
See application file for complete search history.

(56) References Cited

U.S. PATENT DOCUMENTS

| | | | |
|---|---|---|---|
| 3,797,523 A | 3/1974 | Brane et al. | |
| 5,116,491 A * | 5/1992 | Brane ....................... | C02F 1/42 210/143 |

(Continued)

FOREIGN PATENT DOCUMENTS

SU    1097567 A    6/1984

*Primary Examiner* — Ana Fortuna
(74) *Attorney, Agent, or Firm* — Anna Vishev

(57) ABSTRACT

The claimed invention relates to a filtering device for purifying a liquid, intended for softening and purifying tap water and other liquids for domestic use. A device for purifying a liquid, having an inlet channel and an outlet channel, consists of at least two tanks, one for a softening agent and one for a regenerating solution, and a control mechanism including a housing, which consists of at least three parts which form chambers and liquid-conducting cavities, at least two pistons, which are located in the chambers and which are linked by means of a cam mechanism to an engine, a saline valve, and a discharge valve; the control mechanism is designed such that the pistons can move simultaneously in the chambers in opposite directions, at the same time alternately shutting off the liquid-conducting cavities in the housing; at least two liquid-conducting cavities are formed between the indicated portions of the housing, and at least one cavity is formed between the closest portion of the housing to the upper portion of the tank for the softening agent and the upper portion of the tank for the softening agent. The technical result consists in increasing the reliability and simplifying the design of a device for purifying a liquid, and in decreasing the weight of the device for purifying a liquid.

24 Claims, 9 Drawing Sheets

(51) Int. Cl.
    *B01D 21/30*    (2006.01)
    *B01J 49/00*    (2017.01)
    *C02F 1/42*    (2006.01)
    *C02F 5/00*    (2006.01)
    *C02F 1/00*    (2006.01)
    *B01J 39/18*    (2017.01)
    *B01J 49/75*    (2017.01)
    *B01J 49/85*    (2017.01)
    *C02F 101/10*    (2006.01)
    *F16K 31/48*    (2006.01)

(52) U.S. Cl.
    CPC ............... *C02F 1/003* (2013.01); *C02F 5/00* (2013.01); *C02F 2101/10* (2013.01); *C02F 2303/22* (2013.01); *F16K 31/48* (2013.01)

(56) References Cited

U.S. PATENT DOCUMENTS

| | | | | |
|---|---|---|---|---|
| 5,628,899 A * | 5/1997 | Vaughan | ................... | C02F 1/42 137/599.15 |
| 6,176,258 B1 * | 1/2001 | Bernardi | ........... | F16K 31/52483 137/554 |
| 6,349,835 B1 * | 2/2002 | Saux | ................... | B01D 61/025 210/194 |
| 6,878,293 B1 * | 4/2005 | Portyrata | ............. | B01D 24/105 137/106 |
| 8,302,631 B2 | 11/2012 | Quinn et al. | | |
| 2004/0173510 A1 * | 9/2004 | Jung | ................. | B01D 24/4642 210/108 |
| 2014/0013839 A1 * | 1/2014 | Chandler, Jr. | ............ | C02F 1/42 73/290 R |

\* cited by examiner

DEVICE FOR PURIFYING A LIQUID

TECHNICAL FIELD

The invention relates to a filtering device for fluid treatment intended for softening and cleaning of tap water and other fluids utilized for domestic purposes.

BACKGROUND

Currently, one of the most effective methods to combat increased water hardness is the use of automatic filtering softeners. Such devices, as a result of the liquid processing, provide a replacement of "hard" salts with "soft" salts. Thus, there is a change in the chemical composition of the liquid to be treated, i.e., the calcium and magnesium ions are replaced with sodium ions, with which the ion-exchange resin is enriched. The treated liquid is fed through an inlet duct into a container device filled with a softening agent. After that, softened liquid is fed to the consumer via an output device channel. Over time, the absorption properties of the resin are reduced, and, therefore, it is necessary to regenerate the ion-exchange resin. The recovery process of ion-exchange properties of the resin is carried out by supplying a saline solution into a container with a softening agent, resulting in the inverse substitution of the accumulated calcium and magnesium ions with sodium ions. Then, the ion exchange resin is backwashed, and the eluted contaminants are dumped into drainage.

Fluid treatment devices used for softening a liquid and formed with different design features are known in the prior art and generally operate according to the same algorithm. These devices are primarily characterized by cumbersome and complex technical execution. As used herein, the prior art shows the closest analogs to the technical essence, namely, mechanisms constructed using valve-piston systems for the distribution of liquid in the device for cleaning liquid.

Known design of the device for water purification, according to the U.S. Pat. No. 5,116,491 (IPC B01J 49/00, C02F 1/42, B01D 21/30; . . . 26, May 1992 publ), consists of a control mechanism with two pistons on one shaft and two tanks in one case, where a first tank is filled with the softening agent, and the second tank is filled with a solution promoting regeneration of the softening agent. For purposes of a given algorithm of the device, and to provide liquid interface between the nodes, the device utilizes a valve-piston fluid flow distribution system having a horizontally positioned shaft with two pistons and a master controller. Raw liquid is fed under pressure into the inlet of the housing of the valve-piston system and enters into the chamber, in which the shaft with its rigidly affixed two valves is positioned. The shaft is connected to a drive mechanism for horizontal reciprocating movement of said shaft within said chamber allowing for regulation of the liquid flow within the device for water purification. Chamber, in which the piston shaft is located, has slotted holes, where each hole is an inlet/outlet aperture for raw water, purified water, for drain water discharge and a hole for fluid communication with the tank filled with the solution promoting regeneration of the softening agent. This arrangement of pistons in the chamber allows the passage of fluid through the container filled with the softening agent and the yield softened fluid consumer. After a certain time, the control module includes a motor that moves the rod and piston, and the location of the piston is changed, and they cover the feed stream of liquid into a container with a softening agent in the opposite direction, and the first backwash stage begins, accompanied by a discharge of water into the drain. In the second stage backwashing the simultaneous movement of the rod and including an injector, thereby supplying the regenerate saline solution container of softening agent. After time regeneration is disabled by moving the injector rod and the wash softening process is performed by regenerating the reagent solution, followed by displacement of the rod and the switching of the initial fluid flow into the container filled with softening agent. The input and output channels in the apparatus provide the initial fluid flow into the cavity, where the piston rod with pistons, so this system does not eliminate the pressure drop which reduces the performance of the device. Solving this substantial lack possible by increasing the center distance between the input and output channels, but this will increase the piston stroke and, as a consequence, increase the size of the device.

In the prior-known patent design technology U.S. Pat. No. 6,176,258 (IPC F16K 31/52, F16K 31/524, F16K 11/06, publ. 23 Jan. 2001g). This invention relates to the control device a fluid treatment system which includes two vessel control mechanism with two pistons and drive rotational motion into a reciprocating movement, where the switching of fluid flow using the valve-piston system for distributing fluid streams with a horizontal arrangement of main and additional stocks. When this movement of the piston by means of follower connected to the cam member interconnected with the drive mechanism (motor). As rotation of the cam member a cam follower moves along the path deposited on a side of the cam surface and the piston, respectively, moves in a longitudinal horizontal direction along the axis to the extreme left and right positions (reciprocating) connecting the liquid flow depending on the predetermined algorithm system operation. As soon as rotary cam element continues to rotate, the cam follower passes through track and at this time, respectively, the piston advances to the left and right on the horizontal axis and connecting disconnecting fluid flows. further movement of the piston in accordance with a predefined algorithm, and can perform various functions, such as controlling the regeneration step of softening agent. by U.S. Pat. No. 6,176,258, the main drawback of the design are the external dimensions, where the horizontal position of the piston (rod) is extremely inconvenient for the user since significantly increases the size of the product.

The prior art known to the controlling mechanism of the device for cleaning liquid with two tanks on the U.S. Pat. No. 5,628,899 (C02F 1/42, B01D 24/46, publ. 13 May 1997 city). This device includes two containers filled softening agent, and a container of saline solution (FIG. Not shown), where the relationship of said containers through a controlling mechanism. The controlling mechanism has a housing with inlet and outlet conduits for the treated liquid tank switching valve comprising a rotor, wherein the rotor provides fluid communication between said containers in accordance with a predetermined algorithm device. The rotor has an upper end and a lower end, and the upper and lower chambers separated by a partition. The upper chamber of the rotor has a number of inlet openings in the upper end of the rotor where inlet holes provide fluid communication between the outlet and the upper chamber when the rotor is in the first and second positions. Furthermore, the upper chamber has an outlet which provides fluid communication between the upper chamber and the rotor inlet tank with softening agent. When the rotor turns, this outlet is closed. The lower chamber of the rotor has a number of outlet openings in the upper end of the lower chamber of the rotor. Between the inlet and outlet openings rotor has pads arranged on the rotor circumference, which excludes fluid flow between the inlet and outlet openings on the outside of the rotor, between the rotor and the frame or housing of the valve switching tanks. It is connected to the rotor shaft through the cam member, which selectively rotates about an axis that provides selective rotation of the shaft and rotor about an axis between first and second positions according to a predetermined algorithm device. When the piston has an aperture disposed in the longitudinal direction so that when the piston moves in the longitudinal direction is provided by selectively opening and closing the liquid channel. According to the measurements of the flowmeter, the rotary cam member is installed in the position in accordance with a predetermined algorithm of the system when the cam follower and the piston moving to another position. The motor rotates the cam member and thereby of the rotor shaft in order to provide selective rotation of the rotor from the first position to the second. The advantage of such fluid treatment systems is that the consumer, due to the fact that the system comprises two containers with a softening agent, purified water is always received. Lack of fluid purification system according to the U.S. Pat. No. 5,628,899 is as follows. For the distribution of liquid in the device is used for a joint movement of the piston rod in the longitudinal direction and the rotation of the rotor with the holes, which increases the size and weight of the device for cleaning liquid.

In the prior art device is known by the U.S. Pat. No. 3,797,523 (IPC V01D 29/38, publ. Mar. 19, 1974), which describes the water softener valve assembly design, which uses the valve-piston system for the distribution of liquid within the water softener, the valve assembly has a main body consisting of the lower and upper portions sealingly coupled with standard fasteners. The upper part of the housing is provided with two chambers and a piston disposed therein, wherein each chamber has upper end and a lower end and connected by a channel with a tank for softening agent. The input channel for the source liquid is connected directly to one of said chambers. The maximum lower position of both pistons ensures the flow of incoming feed liquid through the vessel for regenerating the reagent, in accordance with a predetermined algorithm device. In the regeneration step, and the initial backwash liquid flowing in the inlet channel, it is sent directly to the outlet, thereby preventing interruption of water flow to the user performing the regeneration or backwash. Similar features of the claimed device for cleaning fluid and said analog design is the presence in the two control pistons which, in accordance with a predetermined algorithm the respective open and close liquid flows in the device. Moving is done by means of hydraulic piston valve, for example, by means of electromagnetic valves, and springs. In the description, the author refers to the application U.S. application Ser. No. 256,172 (U.S. Pat. No. 3,792,614), and points out that the present system can be equipped with an automatic controller, represented by the analogue contains a number of shortcomings. The disadvantage of this analog is the presence of six hydraulic valves involved in the distribution of fluid within the device. Failure of the valve can result in malfunction of the entire valve assembly of the water softener, and to allocate, for example, saline consumer. Construction pistons comprising as means ensuring movement of said pistons—the spring is not sufficiently reliable. Furthermore, the presence of the springs in the structure of U.S. Pat. No. 3,797,523 may result in the reciprocating motion of the pistons to the accumulation of insoluble impurities on the sealing elements during operation. This significant shortcoming will be eliminated after the structure shown in U.S. Pat. No. 8,302,631, wherein for eliminating the above drawback side walls made of a soft abrasive material.

The prior art discloses a device for cleaning liquid to a node on the control valve U.S. Pat. No. 8,302,631 (IPC F16K 31/48, C02F 1/00, C02F 1/42, F17D 3/00, C02F 5/00, publ. 6 Nov. 2012) selected as the prototype of the claimed invention. Cleaner fluid includes input and output channels, the tank for softening agent and the tank for regeneration solution, housing with conductive fluid channels and six compartments (chambers) designed to contain the cartridges to ensure the efficient movement of them six pistons, drive provided with a number of individual radial cams, driven by a motor, wherein each of said cams able to drive each respective piston and said end cam has an outer edge which has at least one projection and recess for engagement with respective piston. Thus each cam are interconnected through a reduction gear driven by the motor, wherein the pistons are moved by means of a spring and the water pressure, and fluid channels shut-off is performed due to the shape of the radial-piston cam in accordance with a predetermined algorithm. Those. the location of each piston defined in the system configuration of the cam, namely, end peripheral edge configuration of the cam designed to engage with one of said pistons. A significant drawback of the known technical solutions is a complication of the construction by introducing a reducer and a series of cams connected to the individual pistons, which separate the piston performs an appropriate algorithm one operation. Furthermore, the use of radial movement of the cam provides a piston in one direction only, which is used for reverse kinematical additional elements, such as springs, creating additional load on the body of the control mechanism.

DISCLOSURE OF INVENTION

The problem to be solved by the claimed technical solution is the creation of a new control mechanism for purifying liquid and reducing operational costs.

The technical result that can be obtained by carrying out the claimed invention is an increase in reliability and simplification of the design for a liquid treatment device, and weight reduction for devices for purifying liquid.

The claimed technical result is achieved due to the fact that a device for cleaning liquid, having an inlet and an outlet, consists of at least two tanks, i.e., one for the softening agent and one for the regenerating solution, the control mechanism comprising a housing, consisting of at least three parts forming chambers and fluid conducting cavities, at least two pistons disposed in the chambers and interconnected via a cam mechanism with a motor, a saline valve, and a discharge valve, wherein the control mechanism is configured to facilitate a simultaneous movement of the pistons in the chambers in opposite directions and simultaneous variable shut-off of liquid conducting cavities in the housing, wherein at least two liquid conducting cavities are formed between said housing parts, and at least one liquid conducting cavity is formed between the part of the housing closest to the top of the tank for softening agent and the uppermost part of the tank for softening agent, wherein the cam mechanism is in the form a cylindrical cam having an outer profile to provide a two-way movement of these two pistons, wherein two rollers are connected with the shafts of said pistons on which the rollers are installed on the outer profile at an equal distance from each other, each part of the housing has projections and depressions forming said cavity, wherein, in the axial plane, the cavities are combined into the chambers, wherein the parts of the housing are configured to sealingly interconnect at the protrusions, wherein the housing parts are adapted to be inserted into each other, wherein the projections are arranged on the perimeter said housing parts, where the upper part of the housing with the inlet and outlet channels is sealingly connected to the top of the tank for the softening agent so as to position at least two housing parts therebetween, wherein one of said two pistons is connected to a saline valve via the lever mechanism, and the other piston is formed integrally with the discharge valve, wherein the lever mechanism comprises a pusher fixedly mounted on the shaft of the piston, and a lever fixedly mounted on the saline valve, wherein the lever has a shaped groove for the entry therein of said pusher, thus shaped groove being located along the piston stroke and, when the pusher is in said recess or does not contact with the lever, the saline valve is closed, where the pistons and valves are interconnected via a cam mechanism, wherein the apparatus comprises at least two tanks for softening agent and one tank for the regenerating solution, connected interconnected via working lines through a corresponding control mechanism, wherein each tank for softening agent is provided with a control mechanism which are provided with a single controller, wherein each control mechanism is provided with an individual controller, where the apparatus is provided with one drain channel, wherein each tank for softening agent is provided with its own drain channel, wherein the wall of the tank for softening agent includes zones characterized by increased resistance to deformation, where the zones are formed by radial and vertical elements made integrally with the tank wall, wherein at least one side opening for loading softening agent is disposed between the radial elements, wherein an opening for loading softening agent is made at the bottom of the tank for softening agent, wherein the radial elements are spaced preferably not less than 1/7 and not more than 1/3 of the diameter of the tank, preferably 1/5 of the diameter of the tank, wherein at least one lateral opening is preferably reinforced with a vertical element, wherein the radial and vertical elements are disposed relatively in between the input and output means for containment of the softening agent, and the radial and vertical elements are arranged relatively in between the input and output means for containment of the softening agent, wherein said means are advantageously in the form of a corrugated grid and disposed on the inner surface of the wall of the tank for softening agent.

A distinctive feature of the claimed invention is the design of the control mechanism, the relative positions and the interaction of its components. The invention simplifies the design of the control mechanism and thereby improves the reliability and reduces the weight of the device for purifying liquid.

DESCRIPTION OF THE INVENTION

Figure 1:
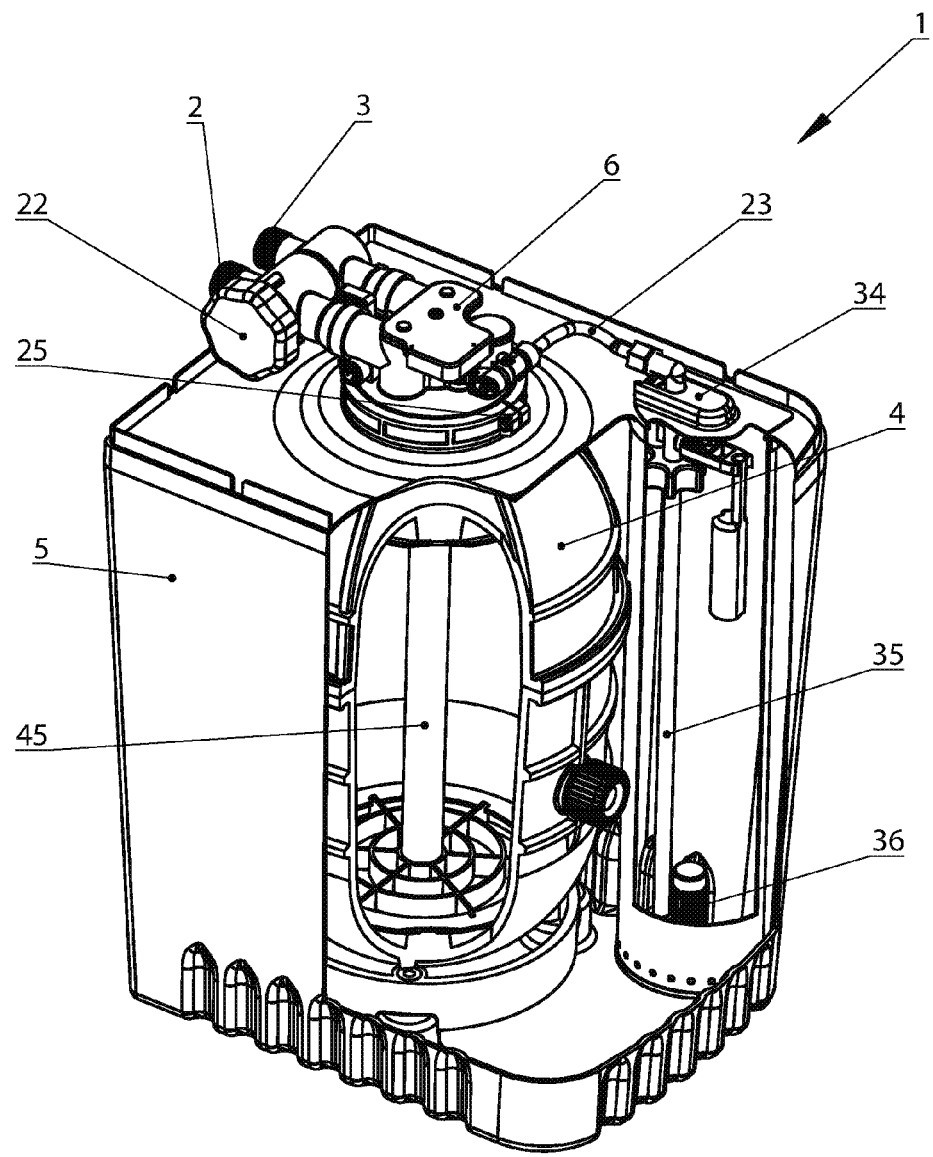
FIG. 1—shows a device for purifying liquid in a perspective, general view in section.
Figure 2:
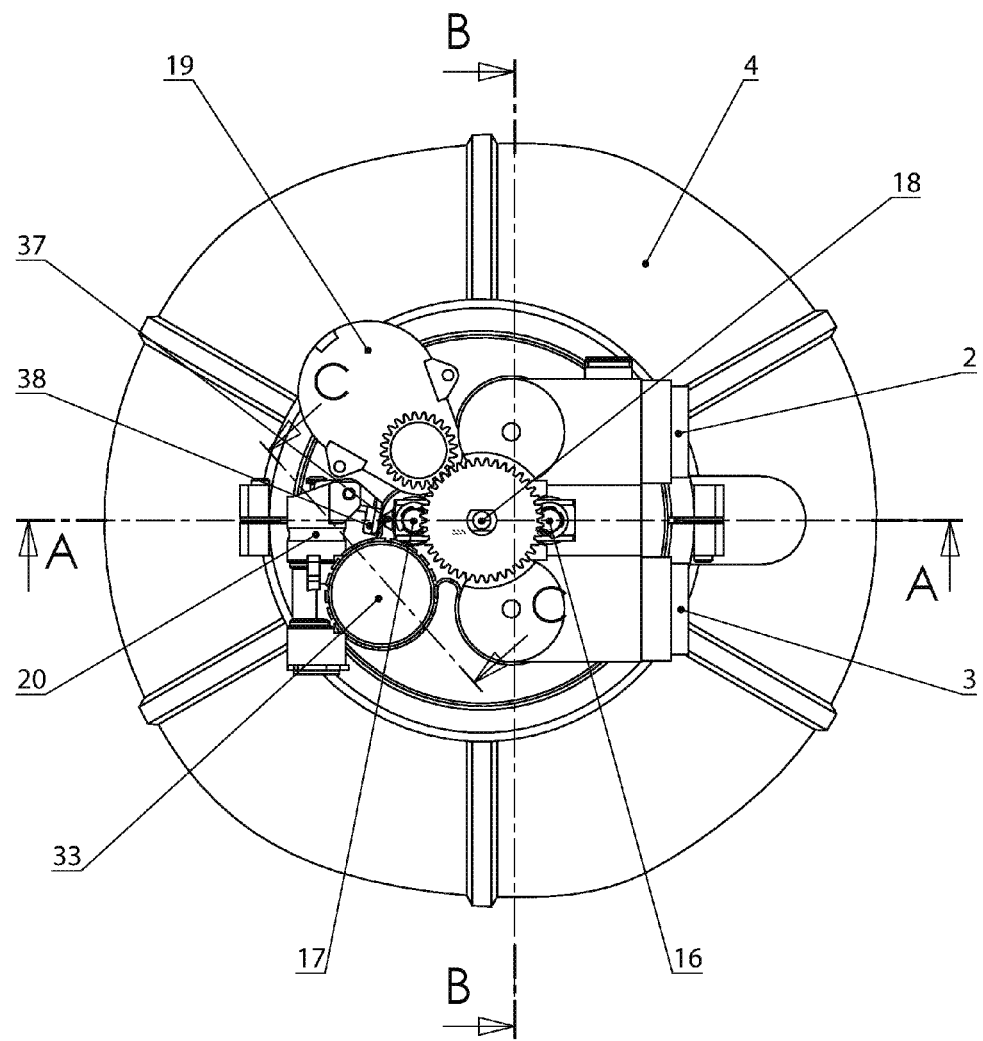
FIG. 2—shows a view from above of the control mechanism positioned on the tank for softening agent.
Figure 3:
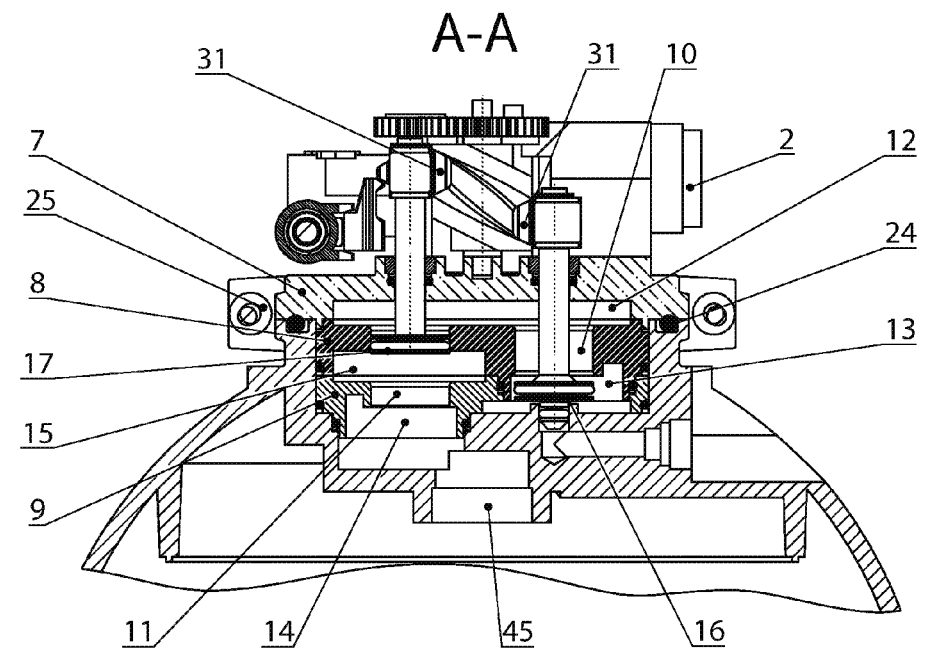
FIG. 3—shows a sectional view A-A, sectional view B-B and sectional view C-C of the housing of the control mechanism (the first position of the control mechanism)
Figure 3:
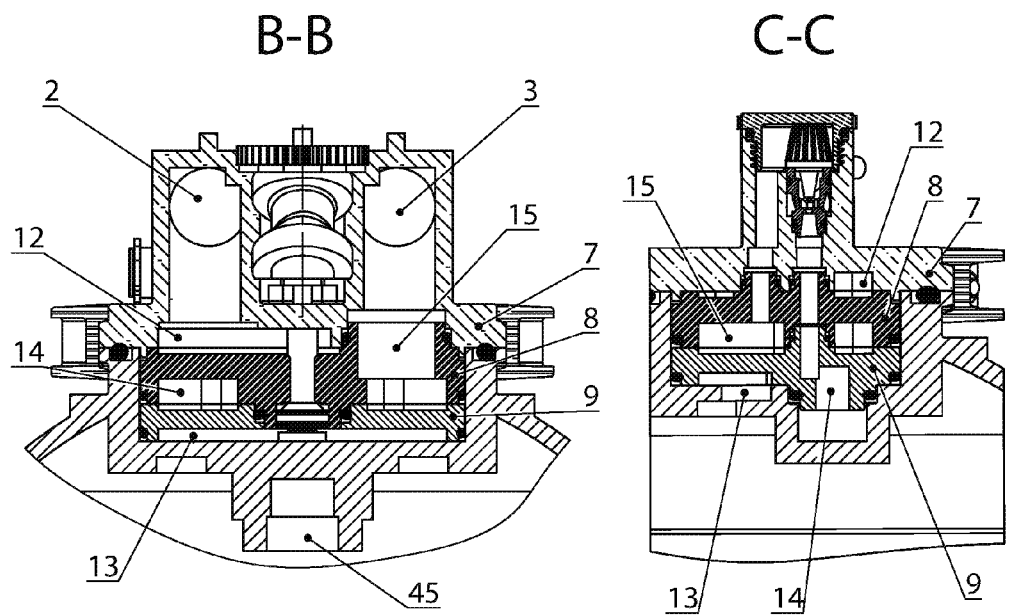
Figure 4:
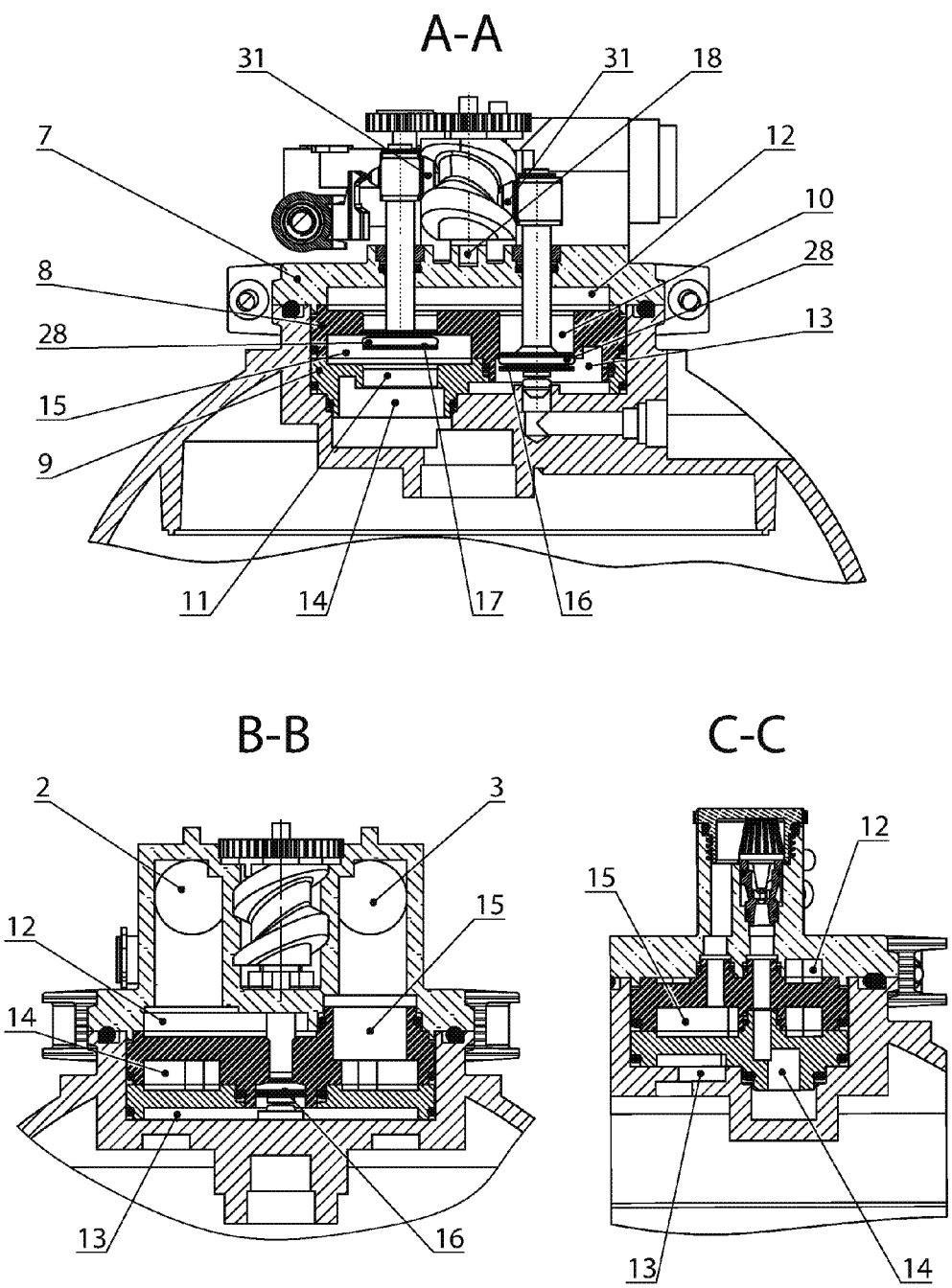
FIG. 4—shows a sectional view A-A, sectional view B-B and sectional view C-C of the housing of the control mechanism (the second position of the control mechanism)
Figure 5:
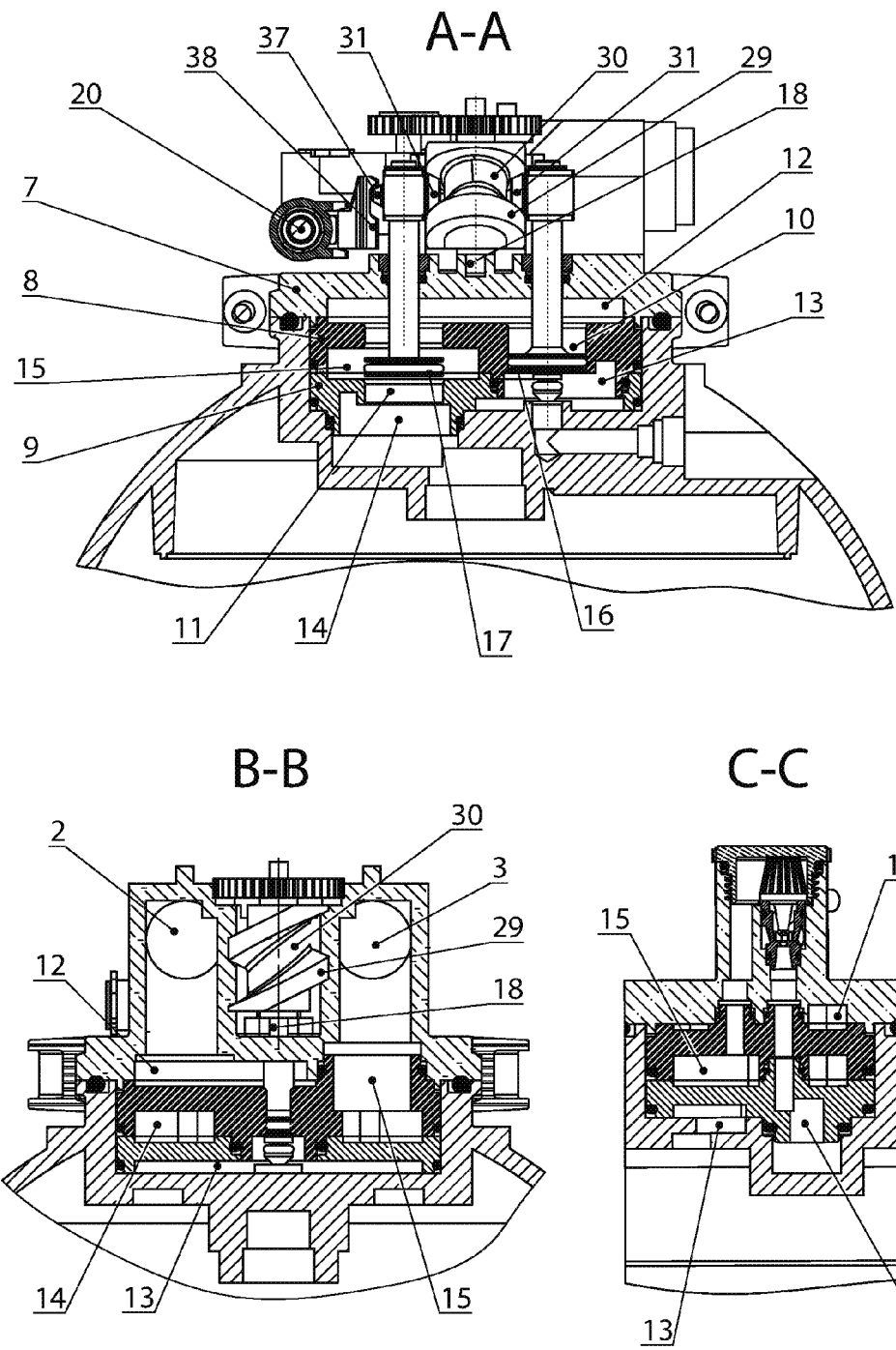
FIG. 5—shows a sectional view A-A, sectional view B-B and sectional view C-C of the housing of the control mechanism (the third position control mechanism)
Figure 6:
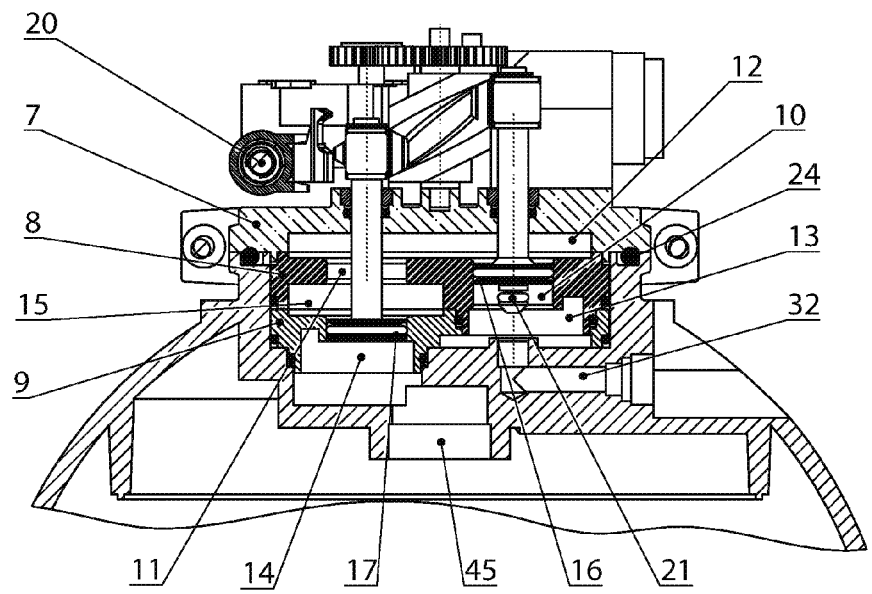
FIG. 6—shows a sectional view A-A, sectional view B-B and sectional view C-C of the housing of the control mechanism (the fourth position of the control mechanism)
Figure 6:
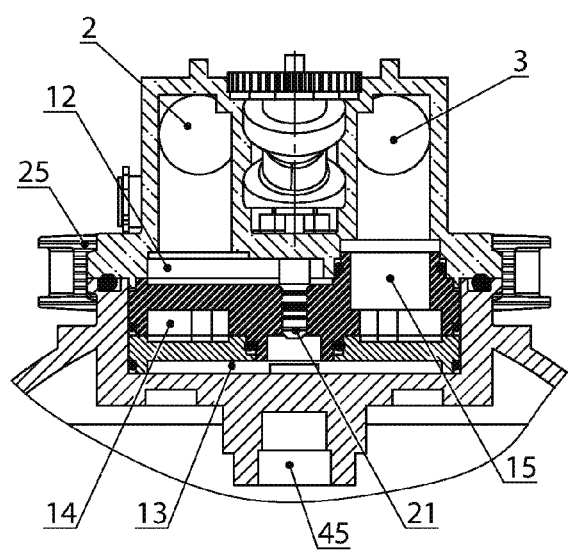
Figure 6:
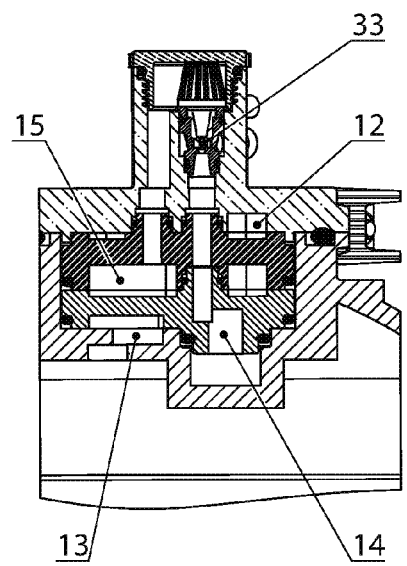
Figure 7:
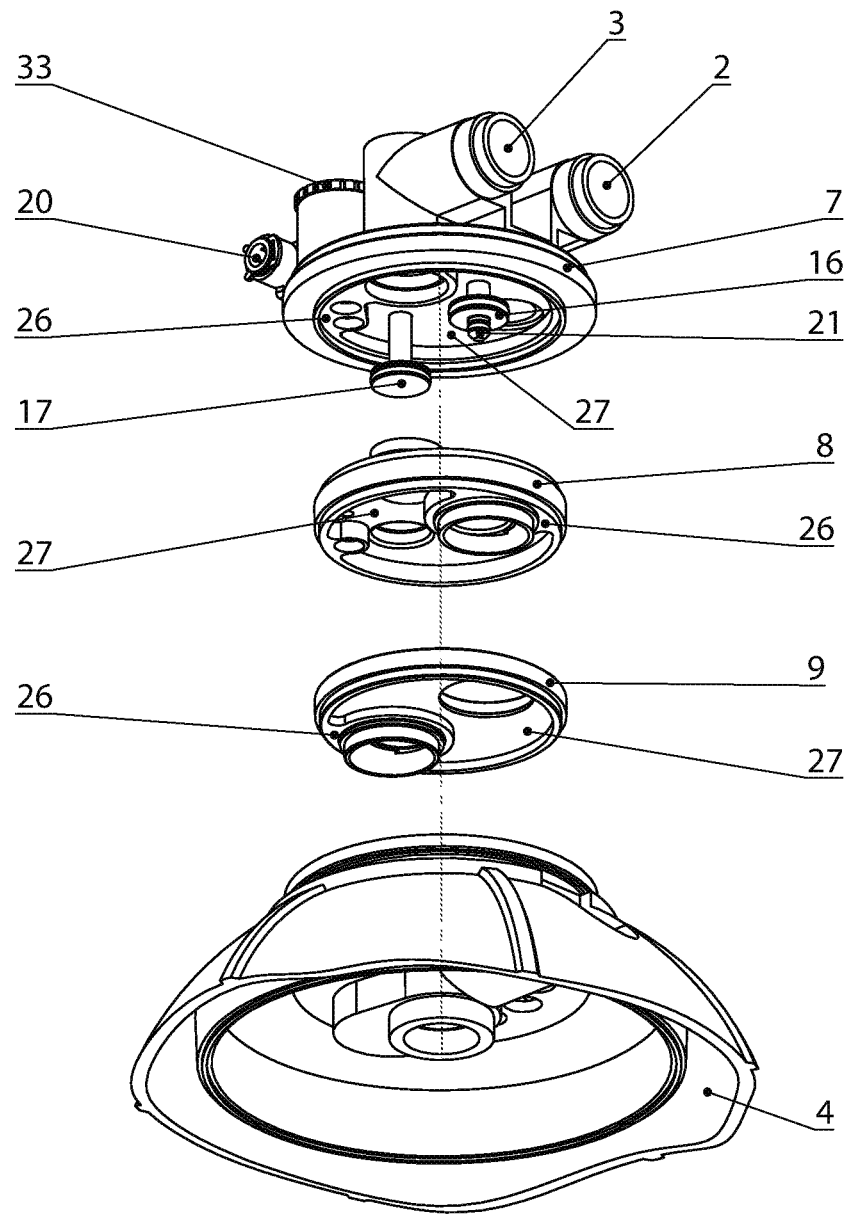
FIG. 7—shows parts of the housing in an exploded perspective view.
Figure 8:
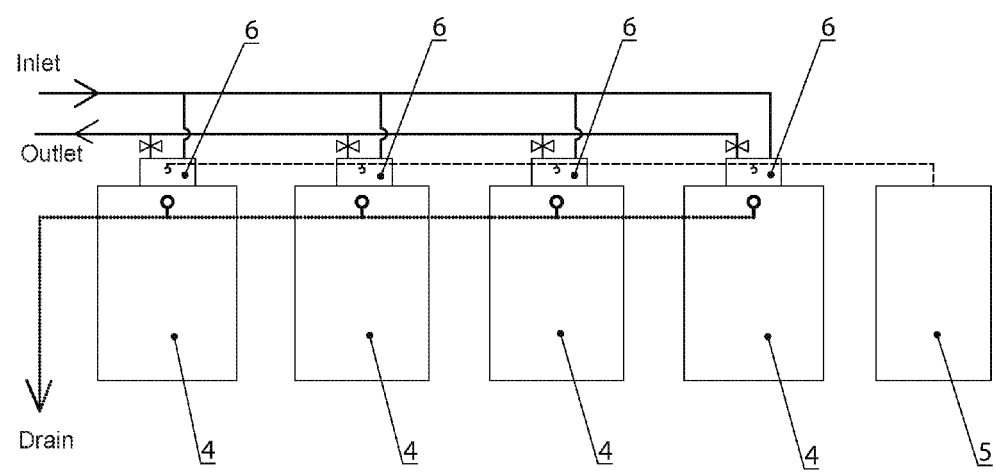
FIG. 8—shows a diagram of the device for purification of liquids, consisting of four tanks for the softening agent and a tank for the regenerating solution.
Figure 9:
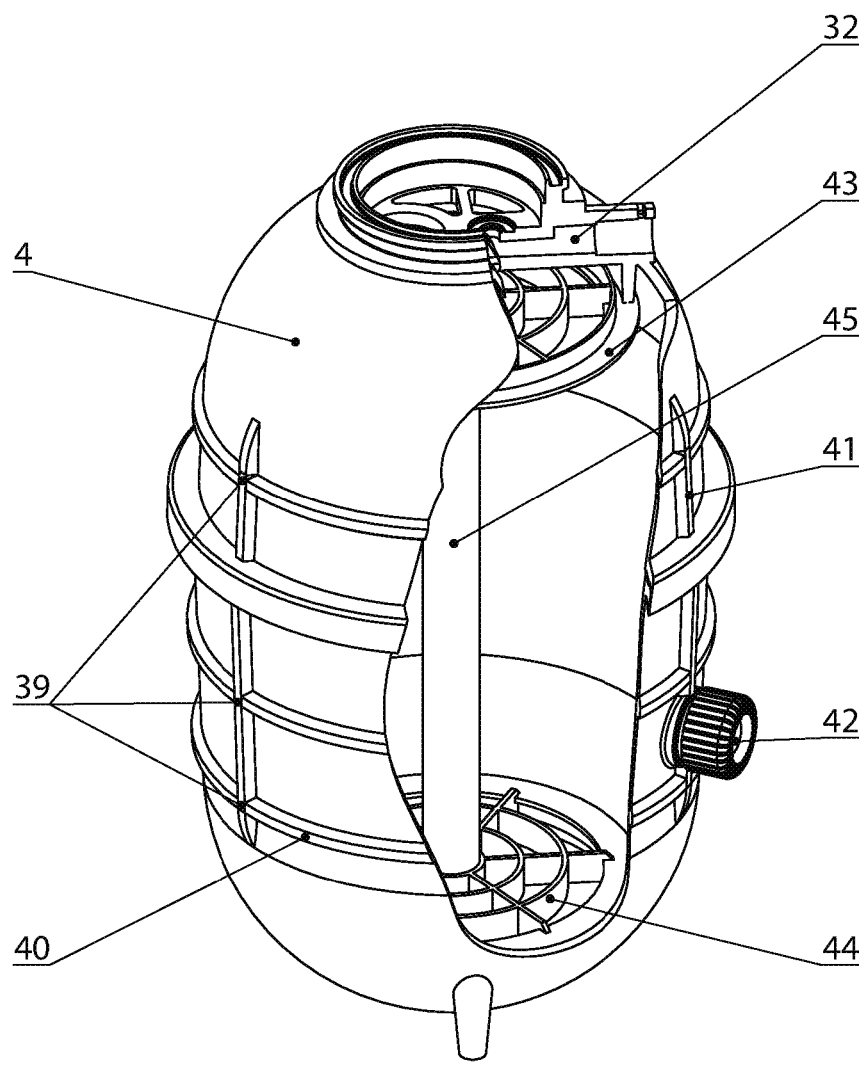
FIG. 9—shows a perspective view of the tank for the softening agent of the device for purifying a liquid.

The inventive apparatus 1 for purifying fluid having the inlet channel 2 and the outlet channel 3 comprises at least tank 4 for a softening agent and tank 5 for a regenerating solution, the control mechanism 6 (FIG. 1), the mechanism comprising a housing, having at least three parts 7, 8, 9 (FIG. 3) forming chambers 10, 11 (FIG. 4) and liquid-conducting cavities 12, 13, 14, 15 (FIGS. 3-6), at least two pistons 16, 17 (FIG. 4) arranged in the chambers 10, 11 (FIG. 4) and saline valve 20 (FIGS. 2,5) and discharge valve 21 (FIG. 6) interconnected through a cam mechanism 18 (FIG. 5) with a motor 19 (FIG. 2). The apparatus 1 may be connected to the pipeline under pressure, such as a drinking-water supply system, therefore the inlet channel 2 can be formed as a nozzle (not shown) with a shut-off hydraulic valve, for example, mechanical 22 (FIG. 1). To the outlet channel 3 can be connected, for example, a water supply pipe of residential buildings. Tank 4 for the softening agent and tank 5 for the regenerating solution are interconnected via the control mechanism 6, for example, via a flexible connecting tube 23 (FIG. 1). The housing of the control mechanism 6 may be formed, for example, integrally with the upper portion of the tank 4 for the softening agent (FIG. 6) or as a separate body connected with the upper part of the tank 4 for softening agent, for example, via a threaded connection (not shown). The control mechanism 6 is intended for distribution of the incoming fluid to be cleaned, and of the liquid located inside the apparatus 1 in sequence according to a predetermined algorithm of the apparatus 1. The housing of the control mechanism 6 (FIG. 2) includes at least three parts 7, 8, 9 (FIGS. 3-6) sealingly interconnected to each other using the sealing elements 24 (FIG. 3), which sealing elements 24 are, preferably, circular O-rings. In the inventive construction, part 7 of the housing with an inlet channel 2 and an outlet channel 3 (FIG. 7) is sealingly connected to an upper portion of the tank 4 for softening agent via, for example, a clamp 25 (FIG. 1), while the other two parts 8 and 9 of the housing are located therebetween, with each housing part being adapted to be insertable into another (FIGS. 3-6). Parts 7, 8, 9 (FIG. 7) of the housing can be made, for example, using an injection-molding machine utilized to manufacture parts from thermoplastic materials by injection molding, that enables the use of the parts without any additional machining. The starting material for the manufacture of parts 8, 9 of the housing is, for example, polyoxymethylene. Parts 7, 8, 9 (FIG. 7) of the housing can be made, for example, in a circular shape or any other shape (not shown). Each part 7, 8, 9 (FIG. 7) of the housing has projections 26 and depressions 27 forming the liquid-conducting cavities 12, 13, 14, 15, wherein in the axial plane said cavities are combined by chambers 10, 11. Projections 26 are located at the perimeter of parts 7, 8, 9 of the housing, wherein the upper part 7 of the housing with inlet channel 2 and outlet channel 3 is sealingly connected to the top of the tank 4 for the softening agent such that at least two parts 8, 9 of the housing can be positioned therebetween. Cavities 12, 13, 14, 15 (FIG. 3) intersect with at least two chambers 10, 11 (FIG. 4) such that said cavities 12, 13, 14, 15 (FIGS. 3-6) in the inventive design function as fluid-conductive channels, shut-off or connection of which is achieved using at least two pistons 16, 17 located in chambers 10, 11 (FIG. 4). These pistons 16, 17 have slots in which sealing elements 28 are installed (FIG. 4) to enable hermetical sealing between the respective cavities 12, 13, 14, 15 (FIG. 3). Algorithm of the apparatus 1 is installed in the controller (not shown) and is carried out due to a unitary structure of the housing of the control mechanism 6 (FIG. 1) and the reciprocating movement of the pistons 16, 17 in chambers 10, 11 (FIG. 4). Each piston 16, 17 has a shaft which is fixed to a cam mechanism 18 via a pusher (FIG. 4), where the cam mechanism is connected, for example, via a gear, to the motor 19 (FIG. 2). During operation of the apparatus 1, movement of the pistons 16, 17 is achieved by the design of the rotary cam mechanism 18 driven by motor 19 (FIG. 2). The cam mechanism 18 is formed as a cylindrical cam 29 with the outer profile 30 to provide a two-way movement of the two pistons 16, 17 (FIG. 5). The outer profile 30 includes at least two rollers 31 set equidistant from each other (FIG. 3) and connected with said pistons 16, 17 on the shafts. Course of the cam can be determined by those skilled in the art, depending on the dimensions of the device for purifying the fluid and its performance. The claimed apparatus 1 for purifying fluid provides a stage of backwash and regeneration of the softening agent. Backwash of the softening agent provides cleaning of the most contaminated lower layers, where the pollution settles, followed by discharge of flushing liquid through the discharge valve 21 into the drainage channel 32 (FIG. 6). For the best removal of such contaminants from the fluid being cleaned, generally, the tank for softening agent is provided with the input and output means of containment of the softening agent, which also perform pre-filter and post-filter function, respectively. These means are usually disposed on and fixed to the inner surface of the tank's wall. In the claimed invention, in order to increase the filtering capacity of the area, preferably such means are corrugated or formed as a corrugated grid (not shown). Regeneration of the softening agent is carried out by passing a saline solution through a layer of the softening agent. The saline solution is prepared and stored in a tank 5 for the regenerating solution, wherein the tank 5 is equipped with a feed opening (not shown) provided for the replenishment of the tank 5 (FIG. 1) with the regenerating agent, such as table salt. Outsource of the saline solution for regeneration of the softening agent from the tank 5 (FIG. 1) is performed by means of an ejector 33 (FIGS. 2, 6) located outside the housing of the control mechanism 6 (FIG. 1) and interconnected with the saline valve 20 (FIG. 2, 6) and saline node 34 (FIG. 1). Saline node 34 is configured as a housing with a tube 35 conducting saline solution and a filter 36, such as a mesh for trapping undissolved salt granules (FIG. 1). Saline node 34 may be provided, for example, with a saline flow sensor or a salinity sensor (not shown) informing the consumer of the need to refill the tank 5 for the regenerating solution. Saline valve 20 (FIG. 5) is connected via a lever mechanism to the shaft of the nearest piston (in this case, the shaft of the piston 17). The lever mechanism comprises a pusher 37, which is fixedly mounted on the shaft of the piston rod 17, and a lever 38 fixedly mounted on the saline valve 20, where lever 38 has a shaped groove for the entry therein of said pusher 37, and wherein the shaped groove is located along the course of piston 17, and, when pusher 37 is positioned in said shaped groove of the lever 38 (FIG. 5) or when it is not in contact with the lever 38 (for example, at the maximum upper position of the piston 17, FIG. 3), then saline valve 20 is closed. The inventive apparatus 1 is provided with a discharge valve 21 (FIG. 6) and a drain channel 32 (FIGS. 6, 9). Discharge valve 21 is actuated and operates synchronously with the nearest piston shaft (in this case with the shaft of piston 16), as shown in FIGS. 3-6. Pistons 16, 17 have the same purpose, namely enclosing some cavities and connecting other cavities to create predetermined flows of liquid, but they have differences in design concept. The shaft of piston 17 is connected to saline valve 20 (FIG. 5) via the leaver mechanism, wherein the saline valve 20 is turned on and off in accordance with a predetermined algorithm of the apparatus 1. The opposing piston 16 is formed integrally with a discharge valve 21 designed to open and close the drain channel 32 (FIG. 6), where the discharge valve 21 is opened and closed in accordance with a predetermined algorithm of the apparatus 1 (FIG. 1). For better understanding of the distribution algorithm for the fluid located within the apparatus 1 for fluid treatment, control mechanism 6 is presented by a longitudinal section A-A, cross section B-B, as well as cross-section C-C (FIGS. 3-6). Device for purifying the liquid may be executed in various modifications, and may include additional tanks with softening agent or, for example, tanks filled with sorption material, and/or ultraviolet sources. Within the claimed invention, the apparatus 1 for purifying liquid comprises at least two, for example, four, tanks 4 for the softening agent and one tank 5 for the regeneration solution (FIG. 8), the tanks being connected therebetween, for example, in series or in parallel using at least three working lines via a corresponding control mechanism 6, wherein each tank 5 for the softening agent includes an operating mechanism 6 (FIG. 8). This construction of the purifying apparatus allows to receive softened water at all stages of fluid purifying process. Additionally, such an apparatus 1 (FIG. 8) may be provided with a single controller (not shown) or each control mechanism 6 may be provided with its own individual controller (not shown), where apparatus 1 is provided with a single drain channel (FIG. 8) or each tank 4 for the softening agent is provided with its own drain channel 32 (FIG. 9). In the disclosed apparatus 1, tank 4 for the softening agent is used for purifying the liquid, where the wall of the tank 4 is formed with areas 39 (FIG. 9), characterized by an increased resistance to deformation, wherein areas 39 are formed by radial 40 and vertical elements 41 made in one piece with the wall of the tank 4 for the softening agent (FIG. 1), and wherein at least one lateral opening 42 (FIG. 9) is located between the radial elements 40. This opening 42 is used for loading the softening agent into the tank 4. Radial elements 40 and vertical elements 41 (FIG. 9), in this case, are preferably spaced by not less than $1/7$ and not more than $1/3$ of the diameter of the tank 4, most preferably by $1/5$ of the diameter of the tank 4. The purpose of manufacturing tank 4 with the radial elements 40 and vertical elements 41 is to increase the reliability of strength of the at least one side opening 42, located between the radial elements 40, wherein the at least one lateral opening 42 is preferably reinforced with the vertical element 41. In order to ensure minimum deformation of the tank 4 for the softening agent, radial elements 40 and vertical elements 41 are arranged between the output 43 and input 44 means of containment of the softening, said means being arranged on the inner surface of the wall of the tank 4 for the softening agent (FIG. 9). The opening 42 for loading the softening agent into the tank 4 can be disposed at the bottom portion of the tank 4 for the softening agent.

Apparatus for purifying the fluid performs as follows. Liquid to be purified, enters from the inlet channel 2 into the apparatus 1 (FIG. 1) for purifying the fluid and flows into the housing of the control mechanism 6 (FIG. 3). The inlet channel 2, in this case, can be connected, for example, to the water supply system or another source of raw liquid under pressure. Within the housing of the control mechanism 6, the flow of raw liquid fills the inner space of the cavity 12 conducting the fluid and further spreads along the open chamber 10 (FIG. 3), where piston 16 (FIG. 3) is located in the lowest most position, and into the tank 4 (FIG. 1) for the softening agent, which is, for example, an ion exchange resin. Such position of the piston 16 allows the passage of the raw liquid into the tank 4 filled with the softening agent. The design of the tank 4 with the softening agent includes a housing with a pipe 45, located in a central portion of the housing (FIG. 1) for output of fluid which passed through the softening agent layer in the interior of the tank 4. Pipe 45 for the output of treated liquid from tank 4 with the softening agent is always in fluid communication with the cavity 14 conducting fluid that provides fluid communication with the outlet channel 3 of the apparatus 1 for purifying the fluid. Piston 17 is positioned at the topmost position that allows the treated liquid to output from the cavity 15 conducting the fluid along chamber 11 (FIG. 4) into the outlet channel 3 of the apparatus 1. Thus, the arrangement of the pistons 16, 17 in the filtering mode (first position of the control mechanism. FIG. 3) enables the supply of the raw liquid into the tank 4 with the softening agent and the subsequent delivery of the treated liquid to the consumer. In the disclosed apparatus 1 for purifying liquid, automatic switching of the modes is performed by a controller (not shown), for example, in accordance with the flow rate of treated liquid, or the time or the total amount of soluble solids in the treated liquid. Repositioning of the pistons 16, 17 is carried out via their interconnection through the cam mechanism 18 with the motor 19. The cam mechanism 18 is rotated to provide movement of the pistons 16, 17, and a control mechanism 6 takes an intermediate position with a brief opening of the saline valve 20 (the second position of the control mechanism, FIG. 4). In this position, pistons 16, 17 do not change the direction of the main flow of the source liquid described above. Because the saline valve 20 is connected to the shaft of the piston 17 via a lever mechanism, there is a brief opening of the saline valve 20, which in turn allows for the connection tube 23 and the tube 35 conducting the saline solution to be filled with purified water. Such an option is required to remove the stagnant air (air pockets) which may be formed in these tubes since the last opening of the saline valve 20, in the saline solution supply mode into the tank 4 with the softening agent at the regeneration of the softening agent stage, and is a preparatory operation prior to regeneration of the softening agent. This option is performed during rotation of the cam gear 18 and is an intermediate position, when piston 17 continues to descend in chamber 11 and piston 16 continues to rise in chamber 10. The subsequent stop of the cam mechanism 18 and, accordingly, of the two pistons 16, 17, leads to closing of the saline valve 20 connected to the piston 17 (FIG. 5) and a separation of the fluid conducting cavities 12 and 13 (FIG. 5) with piston 16 (FIG. 4). The control mechanism 6 takes the backwash position (third position of the control mechanism, FIG. 5). Raw fluid continues to flow through the inlet channel 2 of the apparatus 1 into the housing of the control mechanism 6 through the cavity 12 (FIG. 5) and, because the cavity 13 (FIG. 3) is closed and the piston 17 (FIG. 5) has moved downwards and created a fluid communication between cavity 12 and cavity 15, the liquid reverses its direction. This arrangement of pistons 16, 17 provides a flow of source fluid through the cavity 12 into the cavity 15 and further along the chamber 11, in which piston 17 is positioned, and into the cavity 14, which is always in a fluid relationship with the pipe 45. The raw liquid passes along the entire length of pipe 45 and flows through a layer of the softening agent into the cavity 13. The piston 16 is formed integrally with the discharge valve 21 (FIG. 6), the upward movement of which along the chamber 10 enables a fluid communication with the drain channel 32. Such positioning of the control mechanism 6 provides a backwash of the contents of tank 4. During backwashing, outlet channel 3 of the apparatus 1 is open, and the consumer receives initial raw liquid, as the piston arrangement 16, 17 provides a fluid communication between the inlet 2 and the outlet 3 of the apparatus 1 through the cavities 12 and 15. After the backwash time expires, in accordance with a predetermined algorithm of the apparatus 1, the controller sends a signal to the motor 19, which carries rotation of the cam mechanism 18. The piston 17 is moved to the lowest most position and the piston 16 is moved to the topmost position. The control mechanism 6 (FIG. 1) takes the position of the regeneration of the softening agent (the fourth position of the control mechanism, FIG. 6). In this position, the piston 17 via the lever mechanism opens the saline valve 20, and separates the cavity 14 from the cavity 15 so that the raw liquid is fed into the tank 4 with softening agent through the ejector 33, located outside the housing of the control mechanism 6, and by the ejection effect saline solution from the tank 5 is fed into the cavity 14 interconnected with the tube 45 of the tank 4 with the softening agent, saline valve 20 is normally open. Piston 16 is located in the topmost position and divides cavities 12 and 13, wherein the fluid connection is created between the cavity 13 and the drain channel 32, the discharge valve 21 is normally open. The softening agent regeneration step continues until the entire saline solution in the tank 5 is utilized. During regeneration, outlet channel 3 of the apparatus 1 is open, and the consumer receives the original raw liquid, as the piston arrangement 16, 17 provides fluid communication between the inlet 2 and the outlet 3 of the apparatus 1 through cavities 12 and 15. Regeneration of the softening agent ends with a backwash, wherein the wash water is passed in the opposite direction in order to agitate the softening agent. Backwashing is done at a predetermined time and depends on the volume of the tank 4 with the softening agent, and is performed at a slower rate than the backwashing performed before the regeneration step. At the end of the regeneration, the controller (not shown) sends a signal to the motor 19, which drives the cam mechanism, and pistons 16, 17 perform a corresponding movement. The outer profile 30 of the cylindrical cam 29 provides a two-way movement of the pistons 16, 17, wherein lifting of the profile 30 of the cylindrical cam 29 corresponds to a stroke of the piston 16, 17 from the topmost position to the lowest most position and vice versa, respectively, for a ½ turn of the cam 18. Movement of the pistons 16, 17 is performed in the reverse order, the control mechanism 6 takes the backwash position (third position of the control mechanism, FIG. 5). After backwashing is performed, the cam mechanism 18 is rotated with a corresponding movement of the pistons 16, 17 (the second position of the control mechanism, FIG. 4). During the water intake to the tank 5 for the regenerating solution, cam mechanism 18 stops. Further rotation of the cam mechanism 18 and the movement of pistons 16, 17 brings apparatus 1 purifying fluid into the filtering stage. With full rotation (360°) of the cam mechanism 18, control mechanism 6 passes through all stages in accordance with the predetermined algorithm of the apparatus 1 for purifying the fluid. In the claimed invention, all the elements of the control mechanism 6 operate in conjunction with a structure of the housing of the control mechanism 6, where at least two fluid conducting cavities 12 and 15 are formed between the parts of the housing, and cavities 13, 14 are formed between the housing part nearest to the top of the tank 4 for softening agent and the uppermost part of the tank 4. Below is a table showing the device algorithm and position of the control mechanism at each stage of the apparatus for purifying the fluid.

TABLE

| No | Position of the control mechanism | Status of fluid treatment | Fluid output to the consumer | Discharge valve | Saline valve | Salt release into the container with the softening agent | Cam stop |
|---|---|---|---|---|---|---|---|
| 1 | first | Filtration | Clean water | Closed | Closed | No | Yes |
| 2 | second | Gathering water into the tank for the regenerating solution | Clean water | Closed | Open | No | No |
| 3 | third | Fast backwash | Unfiltered water | Open | Closed | No | Yes |
| 4 | fourth | Regeneration of the softening agent | Unfiltered water | Open | Open | Yes | Yes |
| 5 | third | Slow backwash | Unfiltered water | Open | Closed | No | Yes |
| 6 | second | Gathering water into the tank for the regenerating solution | Clean water | Closed | Open | No | Yes |

Although the present invention has been described in connection with the embodiment thereof which is currently considered the most practical and preferred, it should be understood that the invention is not limited to the disclosed embodiments, but rather cover various modifications and variations within the spirit and scope of the appended claims.

The invention claimed is:

1. An apparatus for purifying fluid with inlet and outlet channels, comprising at least two tanks—for softening agent and for regenerating solution, a control mechanism interconnecting said two tanks and comprising a housing, including at least three parts forming chambers and fluid conducting cavities, said inlet channels and outlet channels being connected to said housing, the control mechanism further comprising at least two pistons disposed in the chambers and configured to move within said chambers so as to selectively open and shut off said fluid conducting cavities, said at least two pistons being interconnected by a cam mechanism with a motor, a saline valve, a discharge valve, characterized in that the control mechanism is configured to facilitate a simultaneous movement of the pistons in the chambers in opposite directions and a simultaneous variable shut-off of the fluid conducting cavities in the housing, wherein at least two of the fluid conducting cavities are formed between said housing parts, and at least one of the cavities is formed between a housing part nearest to a top of the tank for softening agent and an uppermost part of the tank for softening agent.

2. The apparatus according to claim 1, characterized in that the cam mechanism is provided with a cylindrical outer profile of a cam to provide a two-way movement of said two pistons.

3. The apparatus according to claim 2, characterized in that two rollers are mounted on the outer profile and connected with shafts of said pistons.

4. The apparatus according to claim 3, characterized in that the outer profile rollers are equidistant from each other.

5. The apparatus according to claim 1, characterized in that each housing part has projections and depressions forming said cavities, wherein in an axial plane the cavities are joined into the chambers.

6. The apparatus according to claim 5, characterized in that the housing parts are configured to sealingly interconnect to each other at the projections.

7. The apparatus according to claim 1, characterized in that each housing part is adapted to be inserted into each other.

8. The apparatus according to claim 5, characterized in that the projections are located along perimeters of said housing parts, wherein an upper part of the housing having the inlet and outlet channels is sealingly connected to the top of the tank for softening agent so as to allow at least two housing parts to be positioned therebetween.

9. The apparatus according to claim 1, characterized in that one of said two pistons is connected to the saline valve via a lever mechanism and the other piston is formed integrally with the discharge valve.

10. The apparatus according to claim 9, wherein the lever mechanism comprises a pusher fixedly mounted on a shaft of the piston, and a lever fixedly mounted on the saline valve, wherein the lever has a shaped groove for an entry therein of the pusher, wherein the shaped groove is positioned along a stroke of the piston and, when the pusher is positioned in said groove or does not contact said lever, the saline valve is closed.

11. The apparatus according to claim 1, characterized in that the pistons and the valves are interconnected via the cam mechanism.

12. The apparatus according to claim 1, characterized in that the apparatus comprises at least two tanks for softening agent and one tank for regenerating solution interconnected via work lines through a corresponding control mechanism, wherein each tank for softening agent control is provided with at least one control mechanism.

13. The apparatus according to claim 12, characterized in that a single controller is provided.

14. The apparatus according to claim 12, characterized in that each control mechanism is provided with an individual controller.

15. The apparatus according to claim 12, characterized in that each tank for softening agent is provided with a drain channel.

16. The apparatus according to claim 1, characterized in that one drain channel is provided within said tank for softening agent.

17. The apparatus according to claim 1, characterized in that a wall of the tank for softening agent is formed with zones having an increased resistance to deformation.

18. The apparatus according to claim 17, characterized in that the zones are formed by radial and vertical elements made integrally with the wall of the tank for softening agent.

19. The apparatus according to claim 18, characterized in that at least one lateral opening for loading softening agent is disposed between the radial elements.

20. The apparatus according to claim 19, characterized in that the at least one lateral opening is reinforced with the vertical element.

21. The apparatus according to claim 18, wherein said radial elements are spaced at intervals of not less than $1/7$ and not more than $1/3$ of a diameter of the tank.

22. The apparatus according to claim 18, characterized in that the radial and vertical elements are disposed relatively between an input and an output means of containment of softening agent, said means being in a form of a corrugated grid and being disposed on an inner surface of the wall of the tank for softening agent.

23. The apparatus according to claim 18, wherein said radial elements are spaced at intervals of $1/5$ of the diameter of the tank.

24. The apparatus according to claim 1, characterized in that an opening for loading softening agent is formed at a bottom of the tank for softening agent.

* * * * *